United States Patent

[11] 3,617,627

[72] Inventor Peter T. McLean
Des Plaines, Ill.
[21] Appl. No. 726,354
[22] Filed May 3, 1968
[45] Patented Nov. 2, 1971
[73] Assignee Teletype Corporation
Skokie, Ill.

[54] CODE CONVERTER SUITABLE FOR USE WITH A KEYBOARD
3 Claims, 3 Drawing Figs.

[52] U.S. Cl. ........................................ 178/17R, 340/365, 235/145
[51] Int. Cl. ........................................ H04l 15/12
[50] Field of Search ........................................ 178/17 A, 17 C, 17 D, 79; 179/90 C, 90 I, 90 K, 84 VF; 340/365, 347 DD; 197/98; 235/145, 146; 250/208

[56] References Cited

UNITED STATES PATENTS

| | | | |
|---|---|---|---|
| 3,465,099 | 9/1969 | Harris | 178/17 |
| 3,381,276 | 4/1968 | James | 340/172.5 |
| 3,334,237 | 8/1967 | Dodsworth | 250/219 |
| 3,104,388 | 9/1963 | Balenger | 340/345 |
| 3,017,463 | 1/1962 | Dinsmore et al. | 178/79 |
| 2,641,753 | 6/1953 | Oliwa | 340/345 |
| 3,526,892 | 9/1970 | Bartlett et al. | 340/365 |
| 3,488,451 | 1/1970 | Nenninger et al. | 179/90 |
| 3,140,357 | 7/1964 | Bischof et al. | 179/84 |

FOREIGN PATENTS

| | | |
|---|---|---|
| 1,091,775 | 11/1967 | Great Britain |
| 1,015,312 | 12/1965 | Great Britain |
| 945,019 | 12/1963 | Great Britain |
| 856,294 | 12/1960 | Great Britain |

OTHER REFERENCES

IBM Vol. 5 No. 6 Nov. 1962 Technical Disclosure " Optical keyboard Encoding System"

*Primary Examiner*—Kathleen H. Claffy
*Assistant Examiner*—Tom D'Amico
*Attorneys*—J. L. Landis and R. P. Miller

ABSTRACT: A photoelectic keyboard includes a code bar for each key, with a plurality of code bars mounted in parallel above 16 light channels. The code bars are each encoded by the presence of a single tine in one of four possible locations in each one of four fields, providing a four-out-of-16 encoding for each key. Depression of any one of the code bars then causes the light to be blocked in four out of the 16 light-carrying channels, and photo pickup cells respond to this blockage of light, providing a single output for each of the four fields. This output for each field is decoded into 2 bits of a corresponding binary character. Any time that more than 1 channel in a given field is blocked, a checking circuit, monitoring the outputs of the photocells, provides an output indicative of an error in the keyboard output.

INVENTOR
PETER T. McLEAN
BY [signature]
ATTORNEY

CODE CONVERTER SUITABLE FOR USE WITH A KEYBOARD

BACKGROUND OF THE INVENTION

In teletypewriter keyboards, it generally is necessary to provide an interlock in order to prevent the simultaneous depression of two keys; so that erroneous outputs are not obtained from the keyboard. In conventional keyboards, this generally is accomplished by means of some of mechanical interlock. Because of the nature of photoelectric keyboards, however, it often is difficult to utilize mechanical lockout approaches; so that some other means of detecting the simultaneous operation of two or more keys is necessary.

In addition, in photoelectric keyboards or in keyboards in which depression of a key closes an electrical contact, it is desirable to provide an encoding scheme consisting of the minimum possible amount of decoding logic; such as, the diodes in the decoding matrices.

SUMMARY OF THE INVENTION

A code converter produces a permutation-coded output signal in response to a digital input signal by first decoding the input signal into an intermediate code having a single digital output signal in each of a plurality of fields. The intermediate output signals then are supplied to a final decoding means which produces the desired permutation-coded output signal.

DETAILED DESCRIPTION

Although the code converter of this invention is described in conjunction with a preferred embodiment in the form of a photoelectric keyboard, it should be noted that this embodiment is chosen for purposes of illustration only; and that other types of keyboards or digital inputs could be employed utilizing the same basic principles of the invention.

Figure 1:
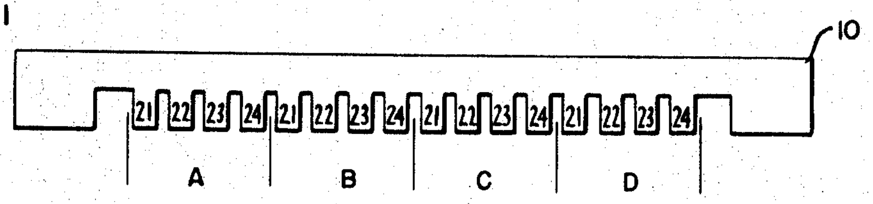
FIG. 1 shows a universal code bar of the type used in a photoelectric keyboard employed in a preferred embodiment of the invention.

Referring now to FIG. 1, there is shown a code bar 10 which is used in a photoelectric keyboard for effecting the encoding from a digital input in the form of a key depression to an intermediate code. The code bar 10 shown in FIG. 1 is a universal code bar and has tines 21 to 24 grouped in each of four fields A, B, C and D. In order to encode the code bar 10 for a particular character, all but one of the tines 21 to 24 in each of the fields A to D is broken away; so that only a single tine 21 to 24 appears in each of the four fields. Each code bar used in a keyboard employing the code bars 10 is uniquely encoded with a different pattern of one tine in each of the four fields A through D.

Figure 2:
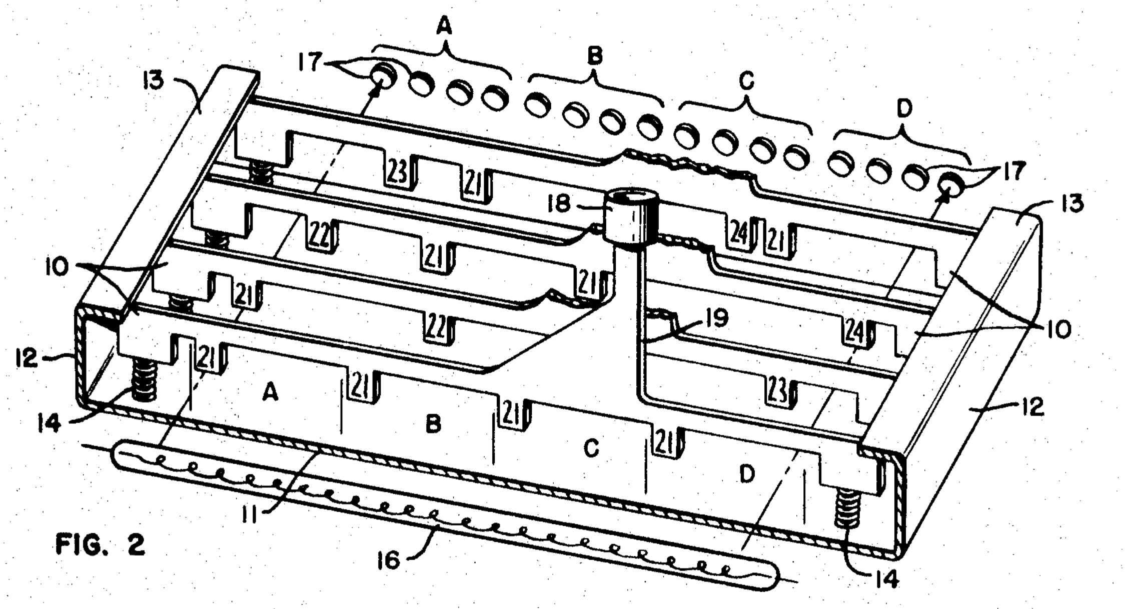
FIG. 2 shows a physical arrangement which may be employed in generating the intermediate code in a preferred embodiment of this invention.

In FIG. 2, there is shown in diagrammatic form a portion of a photoelectric keyboard arrangement including four differently encoded code bars 10. Each of the code bars 10 is mounted in a frame having a base 11 and a pair of vertical extensions 12, each carrying an upper horizontal support member 13 extending over the ends of the code bars 10. The code bars 10 then are biased upwardly against the lower side of the support member 13 by suitable means, such as return springs 14. In order to prevent the code bars 10 from tipping or becoming misaligned, the ends of the code bars may be guided by any suitable means, such as, slots or projections mounted in the vertical extensions 12. For the purposes of clarity, these guiding means have not been shown in FIG. 2.

The space beneath the tines 21 to 24 of the code bars 10 and the base 11 of the frame comprises 16 light-conducting channels extending from a lamp 16 in parallel with the surface of the base 11 toward 16 photocells 17 arranged in groups of four in fields A, B, C and D corresponding to comparable fields on the code bars 10. The light issuing from the lamp 16 may be collimated light or may be directed through suitable light channels. In order to avoid cluttering the drawing, individual noninterfering light channels have not been illustrated, but each of the code bars 10 are aligned with the groups of photocells 17; so that the tines 21 in each of the fields A, B, C and D are in alignment with the leftmost photocells 17 of each of the fields of photocells. Similarly, the tines 22 are in alignment with the next photocell to the right, the tines 23 in alignment with the third photocell from the left in each of the fields, and the tines 24 are in alignment with the rightmost photocell 17 in each of the fields A, B, C and D.

In the absence of the depression of any of the code bars 10, all of the photocells in all of the fields A through D are illuminated producing similar outputs. Each of the code bars 10, however, may be depressed to a light-blocking position by depression of a keytop 18 attached to each code bar 10 by a link 19. Only one keytop 18 and one link 19 has been shown in the drawing for purposes of clarity, but each of the code bars 10 may be moved downwardly under pressure applied to a keytop 18. When a code bar 10 is moved downwardly to its lowermost position against the support surface 11 of the frame, the light in four out of the 16 channels between the lamp 16 and the photocells 17 is blocked. This blockage occurs in one channel in each of the four fields A, B, C and D; and when the code bar 10 nearest the lamp 16, as shown in FIG. 2, is depressed, the tines 21 present in each of the four fields A, B, C and D block the passage of light to the leftmost photocells 17 in each of the comparable fields of photocells A, B, C and D. This causes an output to be obtained from those photocells which differs from the outputs obtained from the remaining 12 unblocked photocells in the fields A through D.

Similarly, depression of others of the code bars 10 causes different ones of the light channels to be blocked, with one channel in each field, however, always being blocked for depression of any one code bar 10. Since the code bars 10 all are differently encoded, depression of more than one code bar simultaneously causes the blockage of at least two light channels in at least one of the four fields A through D. This is readily apparent from an examination of FIG. 2.

Figure 3:
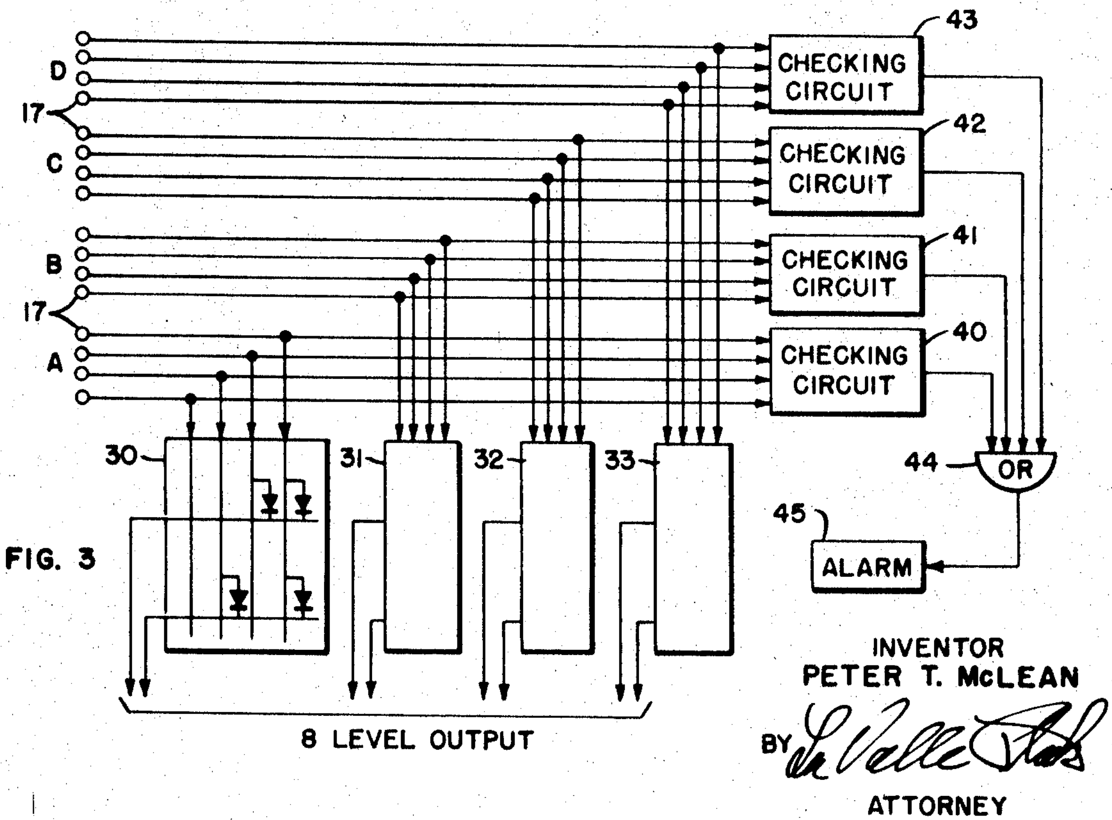
FIG. 3 shows a circuit diagram for decoding the intermediate code into the desired permutation-coded output code.

From the foregoing, it may be seen that depression of a single keytop 18 may be considered a digital input causing one output signal to be obtained from each of four different fields A through D; and these four output signals may be considered as an intermediate code for the keyboard. Referring now to FIG. 3, the photocells 17, also appearing in FIG. 2, are shown grouped into the four fields A, B, C and D. Thus, upon depression of any one keytop 18, an output signal is obtained from one photocell in each of the fields A to D corresponding to the encoding of the tines on the code bar connected to the depressed keytop 18. This causes an output signal to be obtained over one of the output leads in each of the four fields A through D illustrated in FIG. 3. Since the manner in obtaining this output signal from a photocell does not form a part of this invention and may be done any suitable means, the details of producing such an output signal have not been shown. For the purposes of illustration, however, assume that the desired output signal obtained from the photocell having no light impinging upon it is a positive signal; while the output signal from the other three photocells of each field is a negative signal.

Conversion of the one-out-of-four encoded outputs in each of the four fields A to D from the photocells 17 in those four fields may be readily accomplished. The photocells of field A produce inputs on four leads applied to a diode-decoding matrix 30, having two outputs corresponding to the first two bits of an eight-level permutation-coded output signal. As may be seen in FIG. 3, each of the four possible inputs to the matrix 30 produces a different combination of the binary output signals corresponding to the four digital inputs to the matrix 30. The fields B, C and D are supplied respectively to similar diode-decoding matrices 31, 32 and 33, each of which produces two binary outputs corresponding to the particular digital input applied thereto.

Thus, the outputs of the four matrices 30 to 33 provide all of the possible combinations of binary ones and zeros or marks and spaces for the particular bits represented by the four different fields of information encoded on each of the code bars 10. A positive output on any one of the leads extending from the photocells 17 in any one of the fields A, B, C or D produces the corresponding binary encoded output signals from the decoding matrices 30, 31, 32 or 33. Thus, the digital input signal represented by the depression of a keytop 18 first is encoded into an intermediate code consisting of one-out-of-four encoding in each of four fields. This intermediate code then is decoded into the described permutation-coded output signal in the decoding matrices 30 to 33.

In addition to providing an efficient decoding of the original digital input signal, the code converter of this invention provides a capability of detecting an error which occurs by means of the simultaneous depression of two or more keytops 18. As stated previously, when this occurs at least one of the fields A through D has more than one light passage blocked. Thus, detection of the blockage of more than one light channel in the fields A through D may be utilized to detect an error, and to prevent transmission of a character from the keyboard upon the occurrence of such a condition. To accomplish this, the outputs of the photocells in each of the fields A through D are supplied respectively to checking circuits 40 through 43, which may be of any suitable type providing an output signal whenever more than one input is simultaneously applied thereto. Since the code-checking circuits 40 to 43 may be of a conventional type, they have not been illustrated in detail herein. The outputs of the checking circuits 40 to 43 are supplied to an OR-gate 44, the output of which is utilized to control an alarm 45.

Under normal conditions of operation, when only a single output is present in each of the four fields A through D, no output signals are obtained from any of the code-checking circuits 40 to 43; so that no output is obtained from the OR-gate 44, and the alarm 45 is not energized. If, however, any one of the fields A through D simultaneously produces more than one output from the photocells 17 in that field, the corresponding code-checking circuit 40 to 43 produces an output signal which is passed by the OR-gate 44 to energize the alarm 45. Thus, it is possible to detect whenever more than one key is simultaneously operated and to use the output of the alarm 45 to present an alarm to the operator of the keyboard or to prevent transmission of an erroneous character from the keyboard.

Although a particular embodiment of the invention is shown in the drawing and is described in the foregoing specification, it is to be understood that the invention is not limited to that specific embodiment chosen for purposes of disclosure; but covers all changes and modifications which do not constitute departures from the true scope of the invention.

I claim:

1. Apparatus for producing permutation-coded output signals in response to a plurality of inputs including:
 a code device individual to each input and having at least two fields, each containing a plurality of intermediate code elements, with only one of the intermediate code elements in each of said fields being uniquely encoded in accordance with the information represented by the input with which the code device is associated;
 means for selecting a different code device in response to each different input;
 a plurality of decoding devices equal in number to the number of fields; and
 each decoding device associated with only one of the fields and being responsive to the elements of its associated field, of the intermediate code for producing that portion of the elements of the permutation-coded output signals corresponding to the field from which the decoding device receives an input, there being fewer elements in each portion of the permutation-coded output signals than the number of elements in the associated field of the intermediate code.

2. A photoelectric keyboard for producing a permutation-coded output signal in response to the operation of each key in the keyboard including:
 a light source;
 a plurality of light-responsive pickup devices;
 a plurality of light channels divided into at least two fields for conveying light from the light source to the light-responsive pickup devices;
 a code bar individual to and movable by each key carrying light-blocking tines arranged in positions corresponding to the light channels, with at least one tine and no more than one tine on each code bar being present in each of said fields;
 means for moving a code bar from a non-light-blocking position into a position wherein the tines of a selected code bar block light channels corresponding to the positions of the tines of the selected code bar; and
 means responsive to the outputs of the light-responsive devices in each of said fields for producing permutation-coded output signals for each of said fields.

3. A photoelectric keyboard according to claim 2 in which the outputs of the light-responsive devices in each of said fields are supplied to decoding matrices which produce a permutation-coded binary output signal in response to the input signals applied thereto.

* * * * *